(12) United States Patent
Denomme et al.

(10) Patent No.: US 12,339,809 B1
(45) Date of Patent: Jun. 24, 2025

(54) METHODS, SYSTEMS, AND DEVICES FOR AUTOMATICALLY GENERATING, SORTING, AND STORING FUELING STATION DATA

(71) Applicant: Toyota Motor Engineering & Manufacturing North America, Inc., Plano, TX (US)

(72) Inventors: Lauren E. Denomme, Torrance, CA (US); William A. Fanelli, New York, NY (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 0 days.

(21) Appl. No.: 18/740,222

(22) Filed: Jun. 11, 2024

(51) Int. Cl.
*G06F 7/00* (2006.01)
*G06F 16/14* (2019.01)
*G06F 16/172* (2019.01)
*G07C 5/08* (2006.01)

(52) U.S. Cl.
CPC .......... *G06F 16/172* (2019.01); *G06F 16/148* (2019.01); *G07C 5/085* (2013.01)

(58) Field of Classification Search
CPC ...... G06F 16/172; G06F 16/148; G07C 5/085
USPC ..... 707/769, 783, 999.003, 999.01, 999.104, 707/E17.005
See application file for complete search history.

(56) References Cited

U.S. PATENT DOCUMENTS

| 8,943,071 | B2 | 1/2015 | Bishop |
| 9,262,449 | B2 | 2/2016 | Amarendran et al. |
| 10,628,263 | B1 | 4/2020 | Cowen et al. |
| 10,960,783 | B2 | 3/2021 | Boisen et al. |
| 11,164,406 | B2 | 11/2021 | Meroux et al. |
| 11,802,665 | B2 | 10/2023 | Pollica et al. |
| 2007/0038702 | A1 | 2/2007 | Taylor et al. |
| 2008/0195508 | A1 | 8/2008 | Bailey et al. |

(Continued)

FOREIGN PATENT DOCUMENTS

WO 2011116471 A1 9/2011

OTHER PUBLICATIONS

Chevron U.S.A. Inc., Controlled Hydrogen Fleet and Infrastructure Demonstration and Validation Project, Final Technical Report, Jun. 30, 2010, 44 pages total.

*Primary Examiner* — Md I Uddin
(74) *Attorney, Agent, or Firm* — Snell & Wilmer LLP

(57) ABSTRACT

Methods, systems, and devices for generating, sorting and/or storing fueling station data. A method may include storing a fueling data file in a temporary location on a memory. The method may include parsing a filename of the fueling data file to obtain a file number and scanning one or more rows of a table for the obtained file number. The method may include extracting one or more strings from a row of the one or more rows that includes the obtained file number. The method may include determining one or more directory names based on the extracted one or more strings and one or more lookup tables. The method may include generating a directory path based on the determined one or more directory names, and moving and storing the fueling data file from the temporary location to a destination location based on the determined directory path.

19 Claims, 6 Drawing Sheets

(56) References Cited

U.S. PATENT DOCUMENTS

| | | | |
|---|---|---|---|
| 2010/0333092 A1* | 12/2010 | Stefansson | H04L 41/00 718/100 |
| 2012/0096389 A1 | 4/2012 | Flam et al. | |
| 2015/0309929 A1* | 10/2015 | Ishii | G06F 16/185 711/117 |
| 2018/0322558 A1* | 11/2018 | Padmanabh | G06Q 30/0603 |
| 2021/0192867 A1* | 6/2021 | Fang | G07C 5/0816 |
| 2023/0322190 A1 | 10/2023 | Beinborn et al. | |
| 2023/0325458 A1 | 10/2023 | Gursha et al. | |
| 2023/0350877 A1 | 11/2023 | Kumar | |
| 2023/0400151 A1 | 12/2023 | Cohen | |

* cited by examiner

| A | B | C | D | E |
|---|---|---|---|---|
| FILE NUMBER | FILE NAME | TIMESTAMP | FUEL STATION NAME | FUEL PROVIDER NAME |
| 9998 | 999820240202 | 02/02/2023 | IRVINE | PROVIDER A1 |
| 9999 | 999920240303 | 03/03/2024 | NEWPORT | PROVIDER B1 |
| • | • | • | • | • |
| • | • | • | • | • |
| • | • | • | • | • |

FIG. 3

METHODS, SYSTEMS, AND DEVICES FOR AUTOMATICALLY GENERATING, SORTING, AND STORING FUELING STATION DATA

BACKGROUND

1. Field

The present disclosure relates to methods, systems, and/or devices for automatically generating, sorting, and/or storing fueling station data.

2. Description of the Related Art

Fuel providers (e.g., hydrogen gas providers) and/or vehicle manufacturers may generate vast amounts of testing data on a routine basis (e.g., daily, weekly, etc.) to determine whether fueling stations are operating correctly and/or whether vehicles that are refueled by the fueling stations are operating correctly. This may result in a large quantity of files that need to be processed, sorted, and/or archived. Currently this may be done manually by having a user open and read each file to determine what is within the file before moving the file to the correct location within a directory structure. Not only is this manual procedure inefficient and time consuming, but it may not always be possible. For example, opening and reading the files may require specialized software and/or systems that the user does not have access to and/or the files may be opened but don't readily include the information needed to sort the files, with the information needed to sort the files being produced by specialized software after processing the files.

Accordingly, it is desirable to provide methods, systems, and devices for automatically generating, sorting, and/or storing fueling station data.

SUMMARY

In general, one aspect of the subject matter described in this disclosure may be embodied in a system for generating, sorting, and storing fueling data. The system may include a vehicle having one or more fuel sensors. The one or more fuel sensors may be configured to generate vehicle fueling data corresponding to an instance of refueling the vehicle by a fueling station. The system may further include a database. The database may be configured to store fueling station data corresponding to the instance of refueling the vehicle by the fueling station. The fueling station data may include a name of a fuel provider and a name of the fueling station. The system may further include a server having a memory. The server may be configured to receive the vehicle fueling data from the vehicle in a first file format and the fueling station data from the database. The server may be further configured to convert the vehicle fueling data from the first file format to a second file format. The server may be further configured to generate a fueling data file including a filename based on the received vehicle fueling data and the received fueling station data. The fueling data file may have a file number that is associated with data included in the fueling data file. The server may be further configured to store the fueling data file in a temporary location on the memory. The server may be further configured to parse the filename of the fueling data file to obtain the file number. The server may be further configured to scan one or more rows of a table for the obtained file number. The server may be configured to extract one or more strings from a row of the one or more rows that includes the obtained file number. The one or more strings may correspond to the name of the fuel provider and/or the name of the fueling station. The server may be further configured to generate a directory path based on the extracted one or more strings and one or more lookup tables. The server may be configured to move and store the fueling data file from the temporary location to a destination location based on the generated directory path.

In one aspect, the subject matter may be embodied in a method for sorting and storing fueling station data. The method may include storing, by a server, a fueling data file in a temporary location on a memory of the server. The fueling data file may have a filename and may include data corresponding to an instance of refueling a vehicle by a fueling station. The method may further include parsing, by the server, the filename of the fueling data file to obtain a file number that is associated with the fueling data file. The method may further include scanning, by the server, one or more rows of a table for the obtained file number. The method may further include extracting, by the server, one or more strings from a row of the one or more rows that includes the obtained file number. The one or more strings may correspond to a name of a fuel provider and/or a name of the fueling station. The method may further include determining, by the server, one or more directory names based on the extracted one or more strings and one or more lookup tables. The method may further include generating, by the server, a directory path based on the determined one or more directory names. The method may further include moving and storing, by the server, the fueling data file from the temporary location to a destination location on the memory based on the determined directory path.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

FIG. 3 is an illustration of an example table that the fueling station data system of FIG. 1 may utilize to automatically sort and/or store a fueling station data file according to an aspect of the disclosure.

DETAILED DESCRIPTION

Disclosed herein are methods, systems, devices, and/or vehicles for implementing a fueling station data system. Particular embodiments of the subject matter described in this disclosure may be implemented to realize one or more of the following advantages. The fueling station data system may automatically sort and/or store one or more fueling data files that are received by the fueling station data system or generated by the fueling station data system.

Moreover, the fueling station data system may automate archiving the one or more fueling data files in large and complicated directory or file structures by automatically moving and storing the one or more fueling data files in the correct directory (or folder) locations. The fueling station data system may extract data associated with the one or more fueling data files from a table (e.g., a comma-separated values (CSV) file stored on a shared drive) based on a file number of the one or more fueling data files. The fueling station data system may sort the one or more fueling data files based on the extracted data and one or more lookup tables.

Moreover, the fueling station data system may distribute computing load and/or increase efficiency by having a first server generate and/or process the fueling data files and a second server sort and/or store the fueling data files. In addition, the fueling station data system may improve security and/or efficiency by allowing the second server to sort and store the fueling data files without having to open and read and/or process the fueling data files by using the table.

Figure 1:
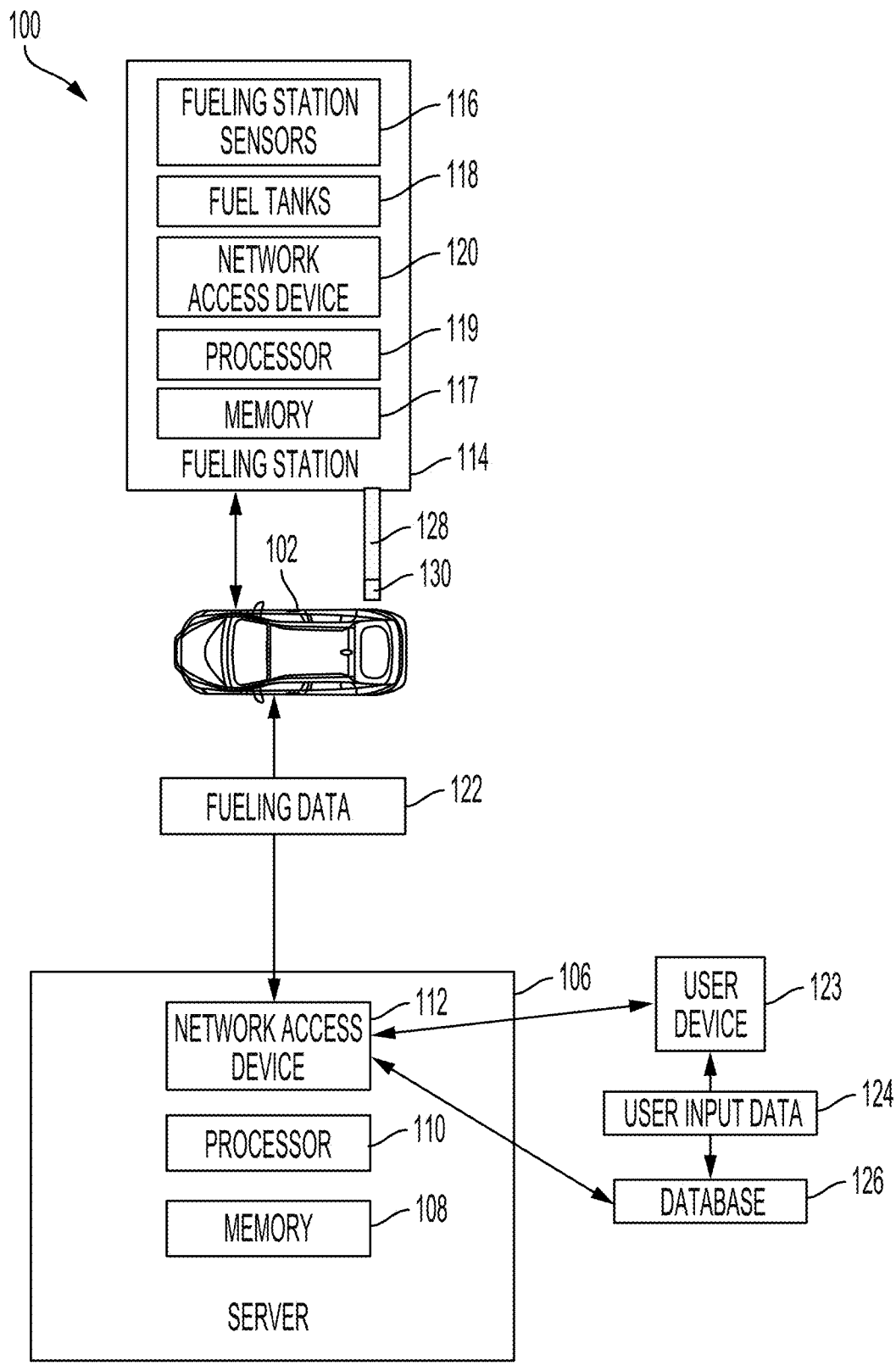
FIG. 1 is a block diagram of an example fueling station data system according to an aspect of the disclosure.

FIG. 1 is a block diagram of an example fueling station data system 100 (also can be referred to as a hydrogen fueling station data system 100) for sorting and storing fueling data (or hydrogen fueling station data). The fueling station data system 100 may include a fueling station 114, a vehicle 102, a server 106, a user device 123, and/or a database 126.

The fueling station 114 may provide fuel or energy to a plurality of vehicles such as the vehicle 102. In examples, the fueling station data system 100 may include a plurality of fueling stations. The fueling station 114 may be a hydrogen gas fueling station that provides hydrogen gas to the vehicle 102. In examples, the fueling station 114 may be an electrical charging station that provides electrical energy to the vehicle 102. The fueling station 114 may generate, store, distribute, and/or provide energy and/or some type of fuel (e.g., the hydrogen gas). The fueling station 114 may include one or more fuel tanks 118, one or more hoses 128, one or more fueling nozzles 130, one or more fueling station sensors 116, a processor 119, a memory 117, and/or a network access device 120.

The one or more fuel tanks 118 may store and/or hold fuel in a liquid state and/or a gaseous state. In examples, all of the one or more fuel tanks 118 may store the fuel in the liquid state or the gaseous state. In examples, at least one fuel tank of the one or more fuel tanks 118 may store the fuel in the liquid state and another at least one fuel tank of the one or more fuel tanks 118 may store the fuel in the gaseous state. For example, the fueling station 114 may store liquid fuel in a first fuel tank of the one or more fuel tanks 118 and may heat and/or pressurize the liquid fuel such that the liquid fuel changes to the gaseous state. The fueling station 114 may store the gaseous fuel in a second fuel tank of the one or more fuel tanks 118 and may provide the gaseous fuel to the vehicle 102 via the one or more hoses 128 and/or the one or more fueling nozzles 130. The one or more fueling nozzles 130 may be coupled to the one or more hoses 128 and may be configured to removably attach to the vehicle 102 such that the vehicle 102 may receive the fuel from the fueling station 114.

The one or more fueling station sensors 116 may be coupled to the one or more fuel tanks 118, the one or more hoses 128, and/or the one or more fueling nozzles 130. The one or more fueling station sensors 116 may measure, detect, and/or determine one or more fueling station metrics including an ambient temperature, a temperature of the one or more fuel tanks 118, a pressure within the one or more fuel tanks 118, an amount of fuel within the one or more fuel tanks 118, an amount of fuel dispensed from the one or more fuel tanks 118, and/or one or more hydrogen fueling metrics during and/or after an instance of the vehicle 102 being refueled by the fueling station 114. The one or more fueling station sensors 116 may generate and/or provide station data (or fueling station data) corresponding to the determined one or more fueling station metrics including the determined ambient temperature, the determined temperature of the one or more fuel tanks 118, the determined pressure within the one or more fuel tanks 118, the determined amount of fuel within the one or more fuel tanks 118, the determined amount of fuel dispensed from the one or more fuel tanks 118, and/or the determined one or more hydrogen fueling metrics. In examples, the station data may further include a timestamp indicating and/or including a year, a month, a day, and/or a time corresponding to when the station data was determined and/or generated (i.e., the timestamp indicates a date and/or a time of when a particular instance of refueling the vehicle 102 by the fueling station 114 occurred). In examples, the one or more fueling station sensors 116 may be and/or include one or more pressure sensors, one or more temperature sensors, one or more hydrogen mass flow sensors (or meters), and/or one or more hydrogen fueling sensors.

The processor 119 may include one or more logic devices such as one or more of a central processing unit (CPU), an accelerated processing unit (APU), a digital signal processor (DSP), a field programmable gate array (FPGA), an application specific integrated circuit (ASIC), or the like. The memory 117 may include any non-transitory memory known in the art. The memory 117 may store instructions usable by the processor 119 to perform operations (i.e., may store specific program instructions for the processor 119 to perform the various actions described herein). The memory 117 may also or instead store other data as instructed by the processor 119 such as storing the station data, a name of the fueling station 114, and/or a name of a fuel provider.

The network access device 120 may be and/or include any network access device capable of communicating via a wireless protocol. In examples, the network access device 120 may communicate via Bluetooth, Wi-Fi, a cellular protocol, vehicle to vehicle (V2V) communications, Zigbee, or any other wireless protocol. The network access device 120 may communicate (i.e., transmit and/or receive data) with respective network access devices of the vehicle 102, the server 106, the user device 123, and/or the database 126. In examples, the processor 119 may transmit, via the network access device 120, the station data, the name of the fueling station 114, and/or the name of the fuel provider to the user device 123, the vehicle 102, the server 106, and/or the database 126.

The user device 123 may be and/or include a mobile device (e.g., a phone, a tablet, a laptop, etc.) or a computer. In examples, the fueling station data system 100 may include a plurality of user devices. In examples, the user device 123 may receive user input from a user indicating the name of the fueling station 114, the name of the fuel provider, and/or at least portions of the station data. The user device 123 may transmit (e.g., via a network access device of the user device 123) the received user input as user input data 124 to the vehicle 102, the server 106, and/or the database 126. In examples, the user device 123 may include a mobile application enabling data input to and/or communication with the server 106 and/or the database 126.

The database 126 may be an external database or may be integrated with the server 106. The database 126 may be a collection of pieces of information that is organized for search and retrieval, such as by a computer, and the database 126 may be organized in directories, tables, schemas, queries, reports, or any other data structures. The database 126 may use any number of database management systems. The database 126 may receive the user input data 124 from the user device 123 and may store the user input data 124 and/or at least a portion of the user input data 124. In examples, the database 126 may receive the station data from the fueling station 114 and may store the station data and/or at least a portion of the station data.

Figure 2:
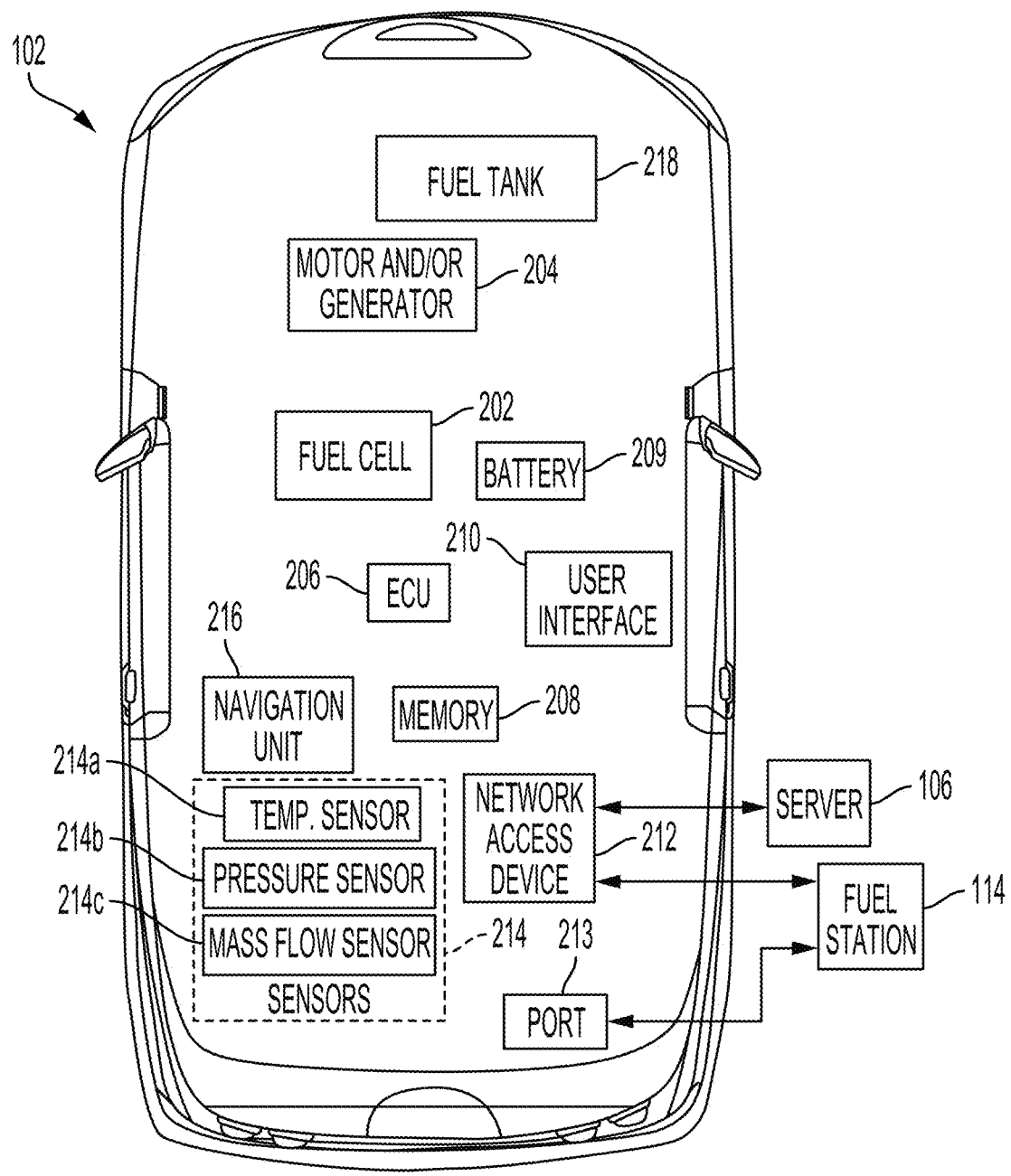
FIG. 2 is a block diagram of an example vehicle of the fueling station data system of FIG. 1 according to an aspect of the disclosure.

Referring briefly to FIG. 2 with continued reference to FIG. 1, the fueling station data system 100 or a portion thereof may be retrofitted, coupled to, include, or be included within the vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 may include a motor and/or generator 204, a battery 209, a fuel cell 202, a fuel tank 218, a port (or fuel port) 213, one or more vehicle fuel sensors 214, an electronic control unit (ECU) 206, a memory 208, a navigation unit 216, a network access device 212, and/or a user interface 210. The motor and/or generator 204 may be located within an engine bay of the vehicle 102 and/or at one or more axles of the vehicle 102. The motor and/or generator 204 may be an internal combustion engine (ICE). In this regard, the motor and/or generator 204 may combust an air and fuel mixture to provide power to the vehicle 102 and/or components of the vehicle 102 and/or the fueling station data system 100. Accordingly, the motor and/or generator 204 can cause the vehicle 102 to accelerate, decelerate, or maintain a desired velocity. It should be understood that the motor and/or generator 204 may include combinations of an ICE and an electric motor, such as for hybrid vehicle applications for example.

In examples, the motor and/or generator 204 may be an electric motor. In this regard, the motor and/or generator 204 may be an electric motor and an electric generator that converts electrical energy into mechanical power, such as torque, and converts mechanical power into electrical energy. The motor and/or generator 204 may be electrically connected to the battery 209 and/or the fuel cell 202. The motor and/or generator 204 may convert energy from the battery 209 (e.g., in a battery electric vehicle (BEV)) and/or the fuel cell 202 (e.g., in a fuel cell electric vehicle (FCEV)) into mechanical power, and may provide energy back to the battery 209, for example, via regenerative braking. The battery 209 may be electrically connected to the motor and/or generator 204 and/or the fuel cell 202 and may receive electrical energy from the motor and/or generator 204 and/or the fuel cell 202 and/or provide electrical energy to the motor and/or generator 204. In examples, the battery 209 may provide electrical energy to components of the fueling station data system 100.

The fuel cell 202 may include a plurality of fuel cells that facilitate a chemical reaction to generate electrical energy. For example, the fuel cell 202 may receive hydrogen from the fuel tank 218 and oxygen, facilitate a reaction between the hydrogen and the oxygen, and output electrical energy in response to the reaction. The electrical energy generated by the fuel cell 202 may be stored in the battery 209 and/or used by the motor and/or generator 204 or other electrical components of the vehicle 102. In examples, the fuel cell 202 may provide electrical energy to components of the fueling station data system 100.

The fuel tank 218 may be fluidly coupled to the fuel cell 202 and may provide fuel to the fuel cell 202 or the motor and/or generator 204. In examples, the fuel tank 218 may store and/or hold hydrogen gas and may provide the hydrogen gas to the fuel cell 202. For example, the fuel tank 218 may hold hydrogen gas at 3,000 to 12,000 pounds per square inch (PSI) (in examples the fuel tank 218 may hold hydrogen gas at below 3,000 PSI or at above 12,000 PSI). The fuel tank 218 may receive fuel (e.g., the hydrogen gas) from the port 213 when the vehicle 102 is being refueled by the fueling station 114.

The port 213 may be fluidly coupled to the fuel tank 218 such that the fuel (e.g., the hydrogen gas) may flow through the port 213 and into the fuel tank 218. The port 213 may be configured to receive and/or removably attach to the one or more fueling nozzles 130 of the fueling station 114 for refueling the vehicle 102.

The one or more vehicle fuel sensors 214 may be coupled to the fuel cell 202, the fuel tank 218, and/or the port 213. The one or more vehicle fuel sensors 214 may measure, detect, and/or determine one or more vehicle fueling metrics including an ambient temperature, a temperature of the fuel tank 218, a pressure within the fuel tank 218, an amount of fuel within the fuel tank 218, an amount of fuel received from the fueling station 114, and/or one or more hydrogen fueling metrics during and/or after an instance of the vehicle 102 being refueled by the fueling station 114. The one or more vehicle fuel sensors 214 may generate and/or provide vehicle fueling data corresponding to the determined one or more vehicle fueling metrics including the determined ambient temperature, the determined temperature of the fuel tank 218, the determined pressure within the fuel tank 218, the determined amount of fuel within the fuel tank 218, the determined amount of fuel received from the fueling station 114, and/or the determined one or more hydrogen fueling metrics. In examples, the vehicle fueling data may further include a timestamp indicating a year, a month, a day, and/or a time corresponding to when the vehicle fueling data was determined and/or generated (i.e., the timestamp indicates a date and/or a time of when a particular instance of the vehicle 102 being refueled by the fueling station 114 occurred). In examples, the fueling station data system 100 and/or the vehicle 102 may include a controller area network (CAN) bus data logger to log the vehicle fueling data and/or to store the vehicle fueling data on the memory 208. In examples, the one or more vehicle fuel sensors 214 may be and/or include one or more temperature sensors 214a, one or more pressure sensors 214b, one or more hydrogen mass flow sensors (or meters) 214c, and/or one or more hydrogen fueling sensors.

In examples, the port 213 and/or the one or more fueling nozzles 130 may include one or more electrical connectors to enable communication between the vehicle 102 and the fueling station 114. For example, the vehicle 102 may receive the station data from the fueling station 114 and/or the fueling station 114 may receive the vehicle fueling data from the vehicle 102. The communication between the vehicle 102 and the fueling station 114 during refueling may increase the safety and accuracy of the refueling and/or may facilitate data collection by the vehicle 102 and/or the fueling station 114.

The user interface 210 may be located within a cabin of the vehicle 102. The user interface 210 may provide an interface to a user (e.g., a driver or a passenger) of the vehicle 102 to interact with and/or receive output from the ECU 206. The user interface 210 may have a user interface element, such as a screen and/or a touchscreen with a button, a switch, a microphone, a speaker, a gesture monitoring sensor, a knob, a graphical user interface (GUI), and/or other input/output devices electrically connected to the ECU 206 to provide input and/or output of information (or data) to and/or from the ECU 206. In examples, the user interface 210 may output the vehicle fueling data and/or the station data to enable the user to monitor refueling of the vehicle 102. In examples, the user interface 210 may enable the user to input additional information corresponding to the instance of refueling the vehicle 102 (which may be stored on the memory 208, in examples). For example, the user interface 210 may be configured to receive user input indicating a name of the fueling station 114, a name of the fuel provider, and/or at least portions of the station data that the fueling station 114 displays and/or prints out (e.g., via a receipt).

The navigation unit 216 may provide vehicle information (or data) and/or navigational map information to the ECU 206. The navigation unit 216 may have and/or be connected to a Global Positioning System (GPS) device. The vehicle information may include a current position and/or location of the vehicle 102, a current date and/or time at the current position, a direction of travel, and/or a current speed of the vehicle 102. In examples, the navigation unit 216 may detect and/or determine the timestamp included within the vehicle fueling data. In examples, the navigation unit 216 may detect and/or determine the name of the fueling station 114 and/or the name of the fuel provider corresponding to the instance of refueling the vehicle 102 based on the current position of the vehicle 102 during the instance of refueling the vehicle 102.

The fueling station data system 100 and/or the vehicle 102 may further include one or more processors and/or microcontrollers, such as the electronic control unit (ECU) 206. The ECU 206 may be implemented as a single ECU or in multiple ECUs, with each ECU of the multiple ECUs controlling one or more components of the vehicle 102 and/or the fueling station data system 100. The ECU 206 may be electrically connected to some or all of the components of the vehicle 102 and/or the fueling station data system 100 via a local area network (LAN) such as, but not limited to, a vehicle bus utilizing one or more protocols (e.g., controller area network (CAN), local interconnect network (LIN), etc.). The ECU 206 may be electrically connected to the motor and/or generator 204, the battery 209, the fuel cell 202, the fuel tank 218, the port 213, the one or more vehicle fuel sensors 214, the user interface 210, the navigation unit 216, the memory 208, and/or the network access device 212. The ECU 206 may include one or more processors, controllers, and/or microcontrollers specifically designed for controlling operations of the vehicle 102 such as receiving fuel, accelerating, braking, etc.

The memory 208 may be electrically connected to the ECU 206. In examples, the memory 208 may be communicatively coupled (e.g., via a network) to the ECU 206 such that the memory 208 is remote from the ECU 206 and/or the vehicle 102. In examples, the memory 208 may be electrically connected to the ECU 206 and a remote memory (e.g., the database 126) may be communicatively coupled to the ECU 206, with the remote memory having similar, additional, and/or different functions as the memory 208 (e.g., greater storage capacity, enabling over-the-air updates, etc.). The memory 208 may store instructions to execute on the ECU 206 and may include one or more of a random access memory (RAM) or other volatile or non-volatile memory. The memory 208 may be a non-transitory memory or a data storage device, such as a hard disk drive, a solid-state disk drive, a hybrid disk drive, or other appropriate data storage, and may further store machine-readable instructions, which may be loaded and executed by the ECU 206. The memory 208 may store vehicle parameters (e.g., a volume of the fuel tank 218, vehicle weight, transmission gear information, etc.).

In examples, the memory 208 may further receive and store the vehicle fueling data and/or the station data as fueling data 122. The fueling data 122 may include all or at least portions of the vehicle fueling data and/or all or at least portions of the station data. In examples, the fueling data 122 may include vehicle fueling data and/or station data for a plurality of instances of refueling the vehicle 102 by a plurality of different fueling stations and/or a plurality of different fuel providers. In examples, the fueling data 122 may further include the name of the fueling station 114 and/or the name of the fuel provider for each instance of the plurality of instances of refueling the vehicle 102. In examples, the memory 208 may store the fueling data 122 in a first file format (e.g., CSV, JSON, ASC, etc.). In examples, the first file format may be a raw data format (e.g., not human readable).

The network access device 212 may be electrically connected to the ECU 206 and/or the memory 208. In examples, the network access device 212 may be a telematic control unit (TCU). The network access device 212 may include a communication port or channel, such as one or more of a Wi-Fi unit, a Bluetooth® unit, a Radio Frequency Identification (RFID) tag or reader, a DSRC unit, and/or a cellular network unit for accessing a network (e.g., CDMA, GSM, 3G, 4G, 5G, etc.). The network access device 212 may transmit data to and receive data from devices and systems not directly connected to the vehicle 102 (e.g., via a network). In examples, the ECU 206 may transmit, via the network access device 212, the fueling data 122 and/or at least portions of the fueling data 122 to the server 106 and/or the database 126.

Turning back to FIG. 1 with continuing reference to FIG. 2, the server 106 may be a cloud server or a dedicated server, and may be hosted in a single location or may be distributed across multiple locations. The server 106 may include redundant capabilities to ensure continuous operation. The server 106 may include a processor 110, a memory 108, and/or a network access device 112.

The processor 110 may include one or more logic devices such as one or more of a central processing unit (CPU), an accelerated processing unit (APU), a digital signal processor (DSP), a field programmable gate array (FPGA), an application specific integrated circuit (ASIC), or the like.

The memory 108 may include any non-transitory memory known in the art. In examples, the memory 108 may be and/or include the database 126. In examples, the memory 108 may be separate from the database 126 but may communicate with the database 126 via the processor 110 and the network access device 112. In examples, the memory 108 may be separate from the database 126 but may have the same or similar function and/or capabilities as the database 126. The memory 108 may store instructions usable by the processor 110 to perform operations (i.e., may store specific program instructions for the processor 110 to perform the various actions described herein). The memory 108 may also or instead store other data as instructed by the processor 110 such as storing the fueling data 122 received from the vehicle 102 and/or the user input data 124 received from the user device 123 or the database 126.

The network access device 112 may be and/or include any network access device capable of communicating via a wireless protocol. In examples, the network access device 112 may communicate via Bluetooth, Wi-Fi, a cellular protocol, vehicle to vehicle (V2V) communications, Zigbee, or any other wireless protocol. The network access device 112 may communicate (i.e., transmit and/or receive data) with respective network access devices of the fueling station 114, the vehicle 102, the user device 123, and/or the database 126.

In examples, the server 106 may receive, via the network access device 112 (and/or via a memory card that is connected to the server 106 by a user), the fueling data 122 from the vehicle 102. The server 106 may receive the fueling data 122 in the first file format. The server 106 may further receive the user input data 124 from the database 126. In examples, the server 106 may receive the user input data 124 directly from the user device 123 and not from the database 126. In examples, instead of receiving the user input data 124, the server 106 may receive the name of the fueling station 114 and/or the name of the fuel provider from the vehicle 102 and/or the fueling station 114. In examples, the server 106 may receive the fueling data 122 in a raw format or a decoded format (e.g., scaled engineering values or physical values).

In examples, the server 106 may convert the received fueling data 122 from the first format (e.g., MFX) to a second file format (e.g., XDT) to analyze the received fueling data 122 and identify the received fueling data 122 as fueling files from non-fueling files.

Figure 4:
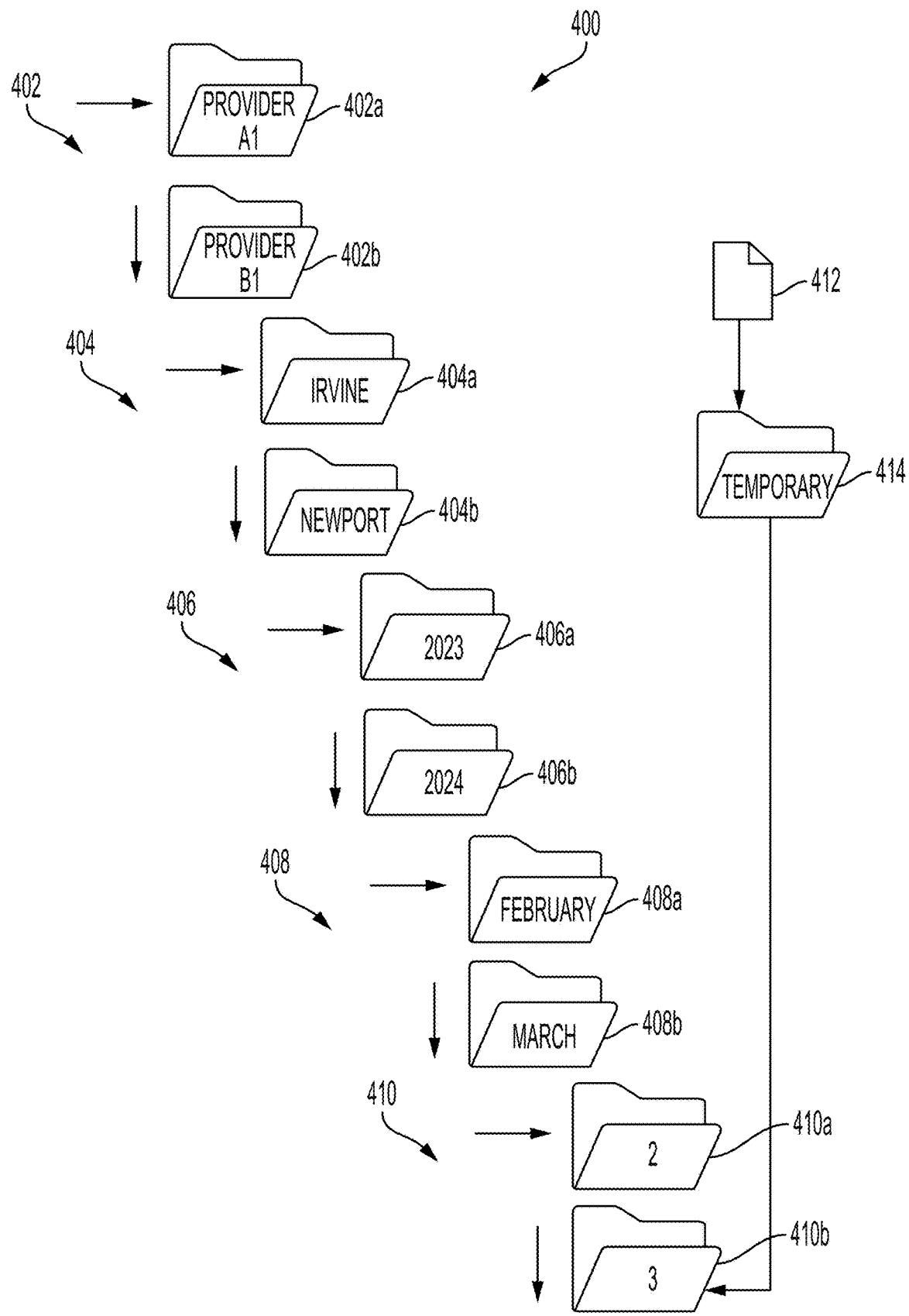
FIG. 4 is an illustration of an example directory structure of the fueling station data system of FIG. 1 according to an aspect of the disclosure.

The server 106 may process and/or convert the received fueling data 122 to generate a fueling data file 412 (not yet shown, marked in FIG. 4). The fueling data file 412 may be in a third file format (e.g., MAT-file). In examples where the fueling data 122 does not include the name of the fueling station 114, the name of the fuel provider, and/or one or more other types of data, the server 106 may process and/or convert the received fueling data 122 and the received user input data 124 to generate the fueling data file 412. The third file format may be a decoded format (e.g., including human readable values, scaled engineering values, and/or physical values). In examples, the fueling data file 412 may include one or more computed values (e.g., a fuel inlet pressure ramp rate) that are computed based on one or more values included in the fueling data 122.

In processing the received fueling data 122 and/or the received user input data 124, the server 106 may associate the vehicle fueling data and/or the station data included in the received fueling data 122 and/or the received user input data 124, each corresponding to the same instance of refueling the vehicle 102, with a file number (or file identifier). That is, the server 106 may generate and/or assign a file number to each instance of refueling the vehicle 102 such that all received data corresponding to a respective instance of refueling the vehicle 102 is grouped and/or related.

The server 106 may generate a filename for the fueling data file 412 based on, in examples, the file number and/or the timestamp associated with the fueling data file 412.

Turning to FIG. 3 with continuing reference to FIGS. 1 and 2, the server 106 may update a table 300 with one or more values included in the fueling data file 412 and/or with one or more computed values that are obtained by processing the vehicle fueling data and/or the station data included in the fueling data file 412. The table 300 may include one or more rows (e.g., a row 302) and a plurality of columns (e.g., columns A-E). The table 300 may be stored on the memory 108 of the server 106 and/or on the database 126. In examples, the table 300 may be stored in a comma-separated values (CSV) file format in a shared drive environment. The table 300 may be and/or include a summary of data corresponding to a plurality of instances of refueling one or more vehicles (e.g., the vehicle 102). In examples, each row of the one or more rows of the table 300 includes data and/or information corresponding to a different instance of refueling the vehicle 102.

In examples, the server 106 may update the one or more rows (e.g., the row 302) of the table 300 with the one or more values (e.g., the one or more fueling station metrics and/or the one or more vehicle fueling metrics) included in the fueling data file 412 and/or with one or more computed values that are obtained by processing the vehicle fueling data and/or the station data included in the fueling data file 412 and corresponding to a respective instance of refueling the vehicle 102. For example, the server 106 may update the row 302 with the file number (e.g., in column A), the file name (e.g., in column B), the timestamp (e.g., in column C), the name of the fueling station 114 (e.g., in column D), the name of the fuel provider (e.g., in column E), and/or additional values corresponding to the respective instance of refueling the vehicle 102 (e.g., a vehicle model and/or identifier, an ambient temperature, a pressure within the fuel tank 218, etc.). It is to be noted that although FIG. 3 illustrates the table 300 as having columns A-E and two rows, the table 300 may include any number of columns and/or rows. After the server 106 has updated the table 300, the server 106 may sort and/or store the fueling data file 412 on the database 126 (in examples, the fueling data file 412 may be stored on the memory 108 or another server or database).

Turning to FIG. 4 with continuing reference to FIGS. 1-3, FIG. 4 illustrates an example directory structure (or folder path) 400 for sorting and/or storing the fueling data file 412 on the database 126. The database 126 may include a plurality of directories and/or folders 402, 404, 406, 408, and 410 for sorting and/or storing the fueling data file 412. In examples, the plurality of directories 402, 404, 406, 408, and 410 may include one or more fuel provider directories 402 with each fuel provider directory of the one or more fuel provider directories 402 having a different directory name corresponding to a name of a fuel provider. For example, the one or more fuel provider directories 402 may include a "Provider A1" directory 402a and a "Provider B1" directory 402b (in examples the one or more fuel provider directories 402 may include one fuel provider directory or may include more than two fuel provider directories).

In examples, the plurality of directories 402, 404, 406, 408, and 410 may further include one or more fueling station directories 404 for more granular sorting of the fueling data file 412. In examples, the one or more fueling station directories 404 may be subdirectories of the one or more fuel provider directories 402. Each fueling station directory of the one or more fueling station directories 404 may have a different directory name corresponding to a name of a fueling station (e.g., the fueling station 114). For example, the one or more fueling station directories 404 may include an "Irvine" directory 404a and a "Newport" directory 404b (in examples the one or more fueling station directories 404 may include one fueling station directory or may include more than two fueling station directories).

In examples, the plurality of directories 402, 404, 406, 408, and 410 may further include one or more year directories 406 for more granular sorting of the fueling data file 412. In examples, the one or more year directories 406 may be subdirectories of the one or more fuel provider directories 402 and/or the one or more fueling station directories 404. Each year directory of the one or more year directories 406 may have a different directory name corresponding to a year. For example, the one or more year directories 406 may include a "2023" directory 406a and a "2024" directory 406b (in examples the one or more year directories 406 may include one year directory or may include more than two year directories).

In examples, the plurality of directories 402, 404, 406, 408, and 410 may further include one or more month directories 408 for more granular sorting of the fueling data file 412. In examples, the one or more month directories 408 may be subdirectories of the one or more year directories 406. Each month directory of the one or more month directories 408 may have a different directory name corresponding to a month. For example, the one or more month directories 408 may include a "February" directory 408a and a "March" directory 408b (in examples the one or more month directories 408 may include one month directory or may include more than two month directories).

In examples, the plurality of directories 402, 404, 406, 408, and 410 may further include one or more day directories 410 for more granular sorting of the fueling data file 412. In examples, the one or more day directories 410 may be subdirectories of the one or more month directories 408. Each day directory of the one or more day directories 410 may have a different directory name corresponding to a day. For example, the one or more day directories 410 may include a "2" directory 410a and a "3" directory 410b (in examples the one or more day directories 410 may include one day directory or may include more than two day directories).

In examples, the database 126 may include a different directory path and/or may include additional directory paths. In examples, the directory path 400 may include fewer or more directories than shown in FIG. 4 and/or may include directories having different categories and/or names.

To sort and/or store the fueling data file 412, the server 106 may store the fueling data file 412 in a temporary directory (or location or folder) 414. In examples, another server (e.g., having the same or similar functions and/or capabilities as the server 106) may sort and/or store the fueling data file 412 as described herein instead of the server 106 after the another server receives the fueling data file 412 from the server 106.

The server 106 may parse the filename of the fueling data file 412 to obtain the file number or the file number and the timestamp associated with the fueling data file 412. The server 106 may scan the one or more rows of the table 300 for the file number (e.g., "9999"). After finding the row of the table 300 having the file number (e.g., row 302), the server 106 may extract one or more strings (or values) from the row 302 having the file number. For example, the server 106 may extract the name of the fuel provider from a first cell 308, the name of the fueling station 114 from a second cell 306, and/or the timestamp from a third cell 304 based on one or more predetermined column names or numbers and/or a location of a respective column of the plurality of columns. In examples, the one or more strings included in the table 300 may include any values as disclosed herein, such as any values determined by the one or more fueling station sensors 116 and/or the one or more vehicle fuel sensors 214 and/or included in the fueling data 122 and/or the user input data 124. In examples, the one or more strings included in the table 300 may further include one or more computed values and/or any other type of hydrogen fueling data that is obtained from processing and/or converting the fueling data 122.

In examples, the server 106 may extract the name of the fuel provider by extracting a first string (or data) from a cell of the table 300 that is in the row having the file number (e.g., row 302) and that is in a first predetermined column (e.g., column E) (in examples the values of the table 300 may be in different columns of the plurality of columns and/or the plurality of columns may have different labels). That is, the server 106 may know the arrangement of the plurality of columns of the table 300 based on the plurality of columns having a predetermined arrangement.

In examples, the server 106 may not know the arrangement of the plurality of columns and/or may have to determine the arrangement of the plurality of columns. For example, the server 106 may parse the row 302 to determine what type of string or value (e.g., timestamp, name of the fueling station 114, etc.) is in each cell along the row 302. The server 106 may then determine the arrangement of the plurality of columns based on the determined type of string or value in each cell along the row 302.

The server 106 may determine and/or select a first directory (or folder) name based on the extracted name of the fuel provider. For example, the server 106 may determine and/or select the first directory name by using a first lookup table that includes a plurality of fuel provider names and that relates each of the plurality of fuel provider names to a respective fuel provider directory of the one or more fuel provider directories 402. The server 106 may scan the plurality of fuel provider names within the first lookup table for the extracted name of the fuel provider. When a respective fuel provider name of the plurality of fuel providers names within the first lookup table matches the extracted name of the fuel provider, the server 106 may select the respective fuel provider directory that is related to the respective fuel provider name as the first directory name.

The server 106 may determine and/or select a second directory (or folder) name based on the extracted name of the fueling station 114 and/or the extracted name of the fuel provider. For example, the server 106 may determine and/or select the second directory name by using a second lookup table that includes a plurality of fueling station names and that relates each of the plurality of fueling station names to a respective fueling station directory of the one or more fueling station directories 404. The server 106 may scan the plurality of fueling station names within the second lookup table for the extracted name of the fueling station 114. When a respective fueling station name of the plurality of fueling stations names within the second lookup table matches the extracted name of the fueling station 114, the server 106 may select the respective fueling station directory that is related to the respective fueling station name as the second directory name.

The server 106 may determine and/or select a third directory (or folder) name based on a year within the extracted timestamp or the timestamp obtained from parsing the filename of the fueling data file 412. For example, the server 106 may determine and/or select the third directory name by using a third lookup table that includes a plurality of years and that relates each of the plurality of years to a respective year directory of the one or more year directories 406. The server 106 may scan the plurality of years within the third lookup table for the extracted year. When a respective year of the plurality of years within the third lookup table matches the extracted year, the server 106 may select the respective year directory that is related to the respective year as the third directory name.

The server 106 may determine and/or select a fourth directory (or folder) name based on a month within the extracted timestamp or the timestamp obtained from parsing the filename of the fueling data file 412. For example, the server 106 may determine and/or select the fourth directory name by using a fourth lookup table that includes a plurality of months and that relates each of the plurality of months to a respective month directory of the one or more month directories 408. The server 106 may scan the plurality of months within the fourth lookup table for the extracted month. When a respective month of the plurality of months within the fourth lookup table matches the extracted month, the server 106 may select the respective month directory that is related to the respective month as the fourth directory name.

The server 106 may determine and/or select a fifth directory (or folder) name based on a day within the extracted timestamp or the timestamp obtained from parsing the filename of the fueling data file 412. For example, the server 106 may determine and/or select the fifth directory name by using a fifth lookup table that includes a plurality of days and that relates each of the plurality of days to a respective day directory of the one or more day directories 410. The server 106 may scan the plurality of days within the fifth lookup table for the extracted day. When a respective day of the plurality of days within the fifth lookup table matches the extracted day, the server 106 may select the respective day directory that is related to the respective day as the fifth directory name.

In examples, all or at least one of the first lookup table, the second lookup table, the third lookup table, the fourth lookup table, and/or the fifth lookup table may be stored on the memory 108 and/or the database 126. In examples, all or at least two or more of the first lookup table, the second lookup table, the third lookup table, the fourth lookup table, and/or the fifth lookup table may be separate lookup tables (or dictionaries) or may be combined into one or more lookup tables (or dictionaries).

The server 106 may determine and/or generate a directory (or folder) path based on the determined first directory name, the determined second directory name, the determined third directory name, the determined fourth directory name, and/or the determined fifth directory name. For example, for the fueling data file 412 having the example filename "999920240303" (as shown in FIG. 3) the server 106 may determine and/or generate the directory path as Provider B1/Newport/2024/3/3 (in examples, the server 106 may generate the directory path in other formats).

The server 106 may determine whether the fueling data file 412 is already sorted and stored based on the determined directory path. For example, the server 106 may determine whether Provider B1/Newport/2024/3/3/999920240303 already exists. If the fueling data file 412 has not already been sorted and stored, the server 106 may move the fueling data file 412 from the temporary directory 414 to a destination directory (or location or folder) that is identified by the determined directory path.

Figure 5:
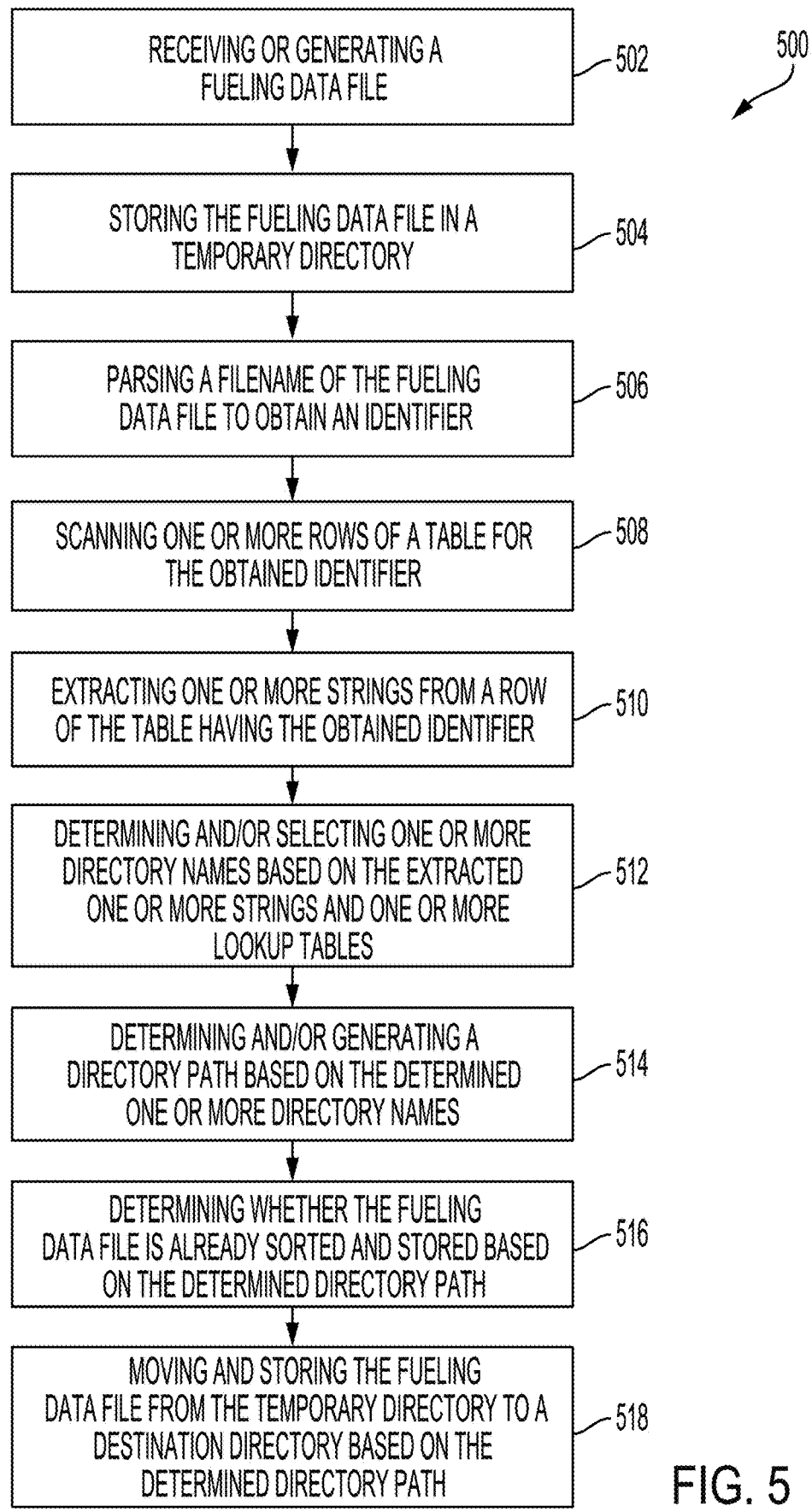
FIG. 5 is a flow diagram of an example process for controlling the fueling station data system of FIG. 1 according to an aspect of the disclosure.

FIG. 5 is a flow diagram of an example process 500 for automatically sorting and storing fueling data (or hydrogen fueling station data). One or more computers or one or more data processing apparatuses, for example, the processor 119, the ECU 206, and/or the processor 110 of the fueling station data system 100 of FIG. 1, appropriately programmed, may implement the process 500. For ease of description, the process 500 is described below with reference to FIGS. 1-4. The process 500 of the present disclosure, however, is not limited to use of the exemplary fueling station data systems of FIGS. 1-4.

The fueling station data system 100 may receive (e.g., by the server 106 or by the server 106 via the network access device 112) and/or generate a fueling data file 412 (502). In examples, the fueling station data system 100 or the server 106 may receive the fueling data file 412 from another server or the database 126 with the another server having processed and/or converted the fueling data 122 into the fueling data file 412 as described herein. In examples, the fueling station data system 100 or the server 106 may not receive the fueling data file 412 from the another server and may instead generate the fueling data file 412 (as described herein and shown by, e.g., FIG. 6).

The fueling station data system 100 may store, via the memory 108, the fueling data file 412 in the temporary directory 414 (504).

The fueling station data system 100 may parse (e.g., via the server 106) the filename of the fueling data file 412 to obtain an identifier (e.g., the file number) (506). In examples, the fueling station data system 100 may parse the filename of the fueling data file 412 to obtain the identifier and/or the timestamp associated with the fueling data file 412 (i.e., the file number or the file number and the timestamp associated with data corresponding to a respective instance of refueling the vehicle 102 that is included in the fueling data file 412).

The fueling station data system 100 may scan (e.g., via the server 106) the one or more rows of the table 300 for the obtained identifier (508). In examples, if the obtained identifier is not found in a row of the one or more rows of the table 300 at block 508, the fueling station data system 100 may end the process 500 and/or may output (e.g., via a user input/output device such as a screen and/or a speaker) a message indicating the obtained identifier can't be found and/or the table 300 needs to be updated.

The fueling station data system 100 may extract (e.g., via the server 106) one or more strings or values (e.g., the name of the fuel provider, the name of the fueling station 114, and/or the timestamp) from the row of the table 300 having the obtained identifier (510).

The fueling station data system 100 may determine and/or select (e.g., via the server 106) one or more directory (or folder) names based on the extracted one or more strings and one or more lookup tables (512). For example, the server 106 may scan a plurality of fuel provider names and/or a plurality of fueling station names included in the one or more lookup tables for the extracted one or more strings corresponding to the name of the fuel provider and/or the name of the fueling station 114, the one or more lookup tables relating each of the plurality of fuel provider names to a fuel provider directory of the one or more fuel provider directories 402 and/or each of the plurality of fueling station names to a fueling station directory of the one or more fueling station directories 404. Next, the server 106 may select a respective fuel provider directory of the one or more fuel provider directories 402 that is related to a respective fuel provider name of the plurality of fuel provider names that matches the extracted one or more strings corresponding to the name of the fuel provider and/or select a respective fueling station directory of the one or more fueling station directories 404 that is related to a respective fueling station name of the plurality of fueling station names that matches the extracted one or more strings corresponding to the name of the fueling station 114. Lastly, the server 106 may determine a first directory name and/or a second directory name based on the selected respective fuel provider directory and/or the selected respective fueling station directory.

The fueling station data system 100 may determine and/or generate (e.g., via the server 106) a directory (or folder) path based on the determined one or more directory names (514).

The fueling station data system 100 may determine (e.g., via the server 106) whether the fueling data file 412 is already sorted and stored based on the determined directory path (516).

The fueling station data system 100 may move and store (e.g., via the server 106) the fueling data file 412 from the temporary directory 414 to a destination directory (or location or folder) based on the determined directory path (518). In examples, the server 106 may move and store the fueling data file 412 from the temporary directory 414 to the destination directory based on the determined directory path and a determination that the fueling data file 412 does not already exist in the destination location (i.e., the fueling data file 412 is not already sorted and stored).

Figure 6:
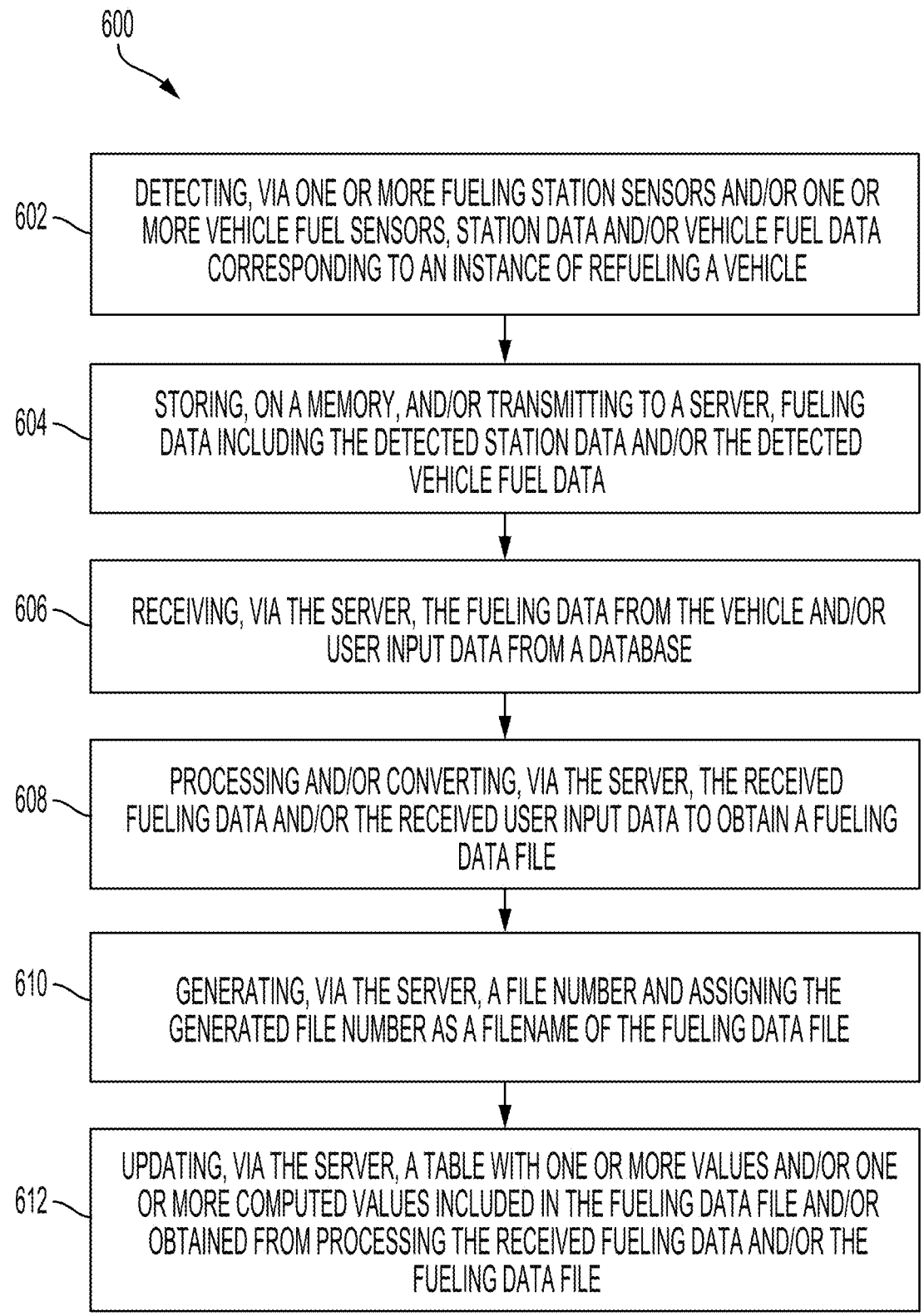
FIG. 6 is a flow diagram of an example process for controlling the fueling station data system of FIG. 1 according to an aspect of the disclosure.

FIG. 6 is a flow diagram of an example process 600 for generating the fueling data file 412 (e.g., as in block 502 of FIG. 5). One or more computers or one or more data processing apparatuses, for example, the processor 119, the ECU 206, and/or the processor 110 of the fueling station data system 100 of FIG. 1, appropriately programmed, may implement the process 600. For ease of description, the process 600 is described below with reference to FIGS. 1-5. The process 600 of the present disclosure, however, is not limited to use of the exemplary fueling station data systems of FIGS. 1-5.

The fueling station data system 100 may detect (e.g., via the one or more fueling station sensors 116 and/or the one or more vehicle fuel sensors 214) station data and/or vehicle fuel data corresponding to an instance of refueling the vehicle 102 (602).

The fueling station data system 100 may store, on the memory 208, and/or transmit (e.g., via the network access device 212 of the vehicle 102 or the network access device 120 of the fueling station 114), to the server 106, the fueling data 122 including the detected station data and/or the detected vehicle fuel data (604).

The fueling station data system 100 may receive (e.g., via the network access device 112 of the server 106) the fueling data 122 from the vehicle 102 and/or the user input data 124 from the database 126 (606). In examples, the received fueling data 122 and/or the received user input data 124 may be in the first file format.

The fueling station data system 100 may process and/or convert (e.g., via the server 106) the received fueling data 122 and/or the received user input data 124 to obtain the fueling data file 412 (608). In examples, the received fueling data 122 and/or the received user input data 124 may be converted to the second file format and/or the third file format. In examples, the server 106 may process and/or convert the received fueling data 122 and/or the received user input data 124 by applying one or more algorithms to the received fueling data 122 and/or the received user input data 124 to obtain one or more computed values and/or one or more human readable values.

The fueling station data system 100 may generate (e.g., via the server 106) a file number and assign (or set) the generated file number as a filename (or at least a portion of the filename) of the fueling data file 412 (610).

The fueling station data system 100 may update (e.g., via the server 106) the table 300 with one or more values and/or one or more computed values included in the fueling data file 412 and/or obtained from processing the received fueling data 122 and/or the fueling data file 412 (612).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for generating, sorting, and storing fueling data, the system comprising:

a vehicle having one or more fuel sensors configured to generate vehicle fueling data corresponding to an instance of refueling the vehicle by a fueling station;

a database configured to store fueling station data corresponding to the instance of refueling the vehicle by the fueling station, the fueling station data including a name of a fuel provider and/or a name of the fueling station; and a server having a memory and configured to automatically:

receive the vehicle fueling data from the vehicle in a first file format and the fueling station data from the database, the vehicle fueling data includes an ambient temperature, a temperature of the fuel tank, a pressure within the fuel tank, an amount of fuel within the fuel tank, and an amount of fuel received from the fueling station, convert the vehicle fueling data from the first file format to a second file format, generate a fueling data file including a filename based on the received vehicle fueling data and the received fueling station data, the fueling data file having a file number that is associated with data included in the fueling data file, store the fueling data file in a temporary location on the memory, parse the filename of the fueling data file to obtain the file number and a timestamp associated with the fueling data file, scan one or more rows of a table for the obtained file number, wherein the table includes a summary of data corresponding to a plurality of instances of refueling the one or more vehicles, extract one or more strings from a row of the one or more rows that includes the obtained file number, the one or more strings corresponding to the name of the fuel provider and/or the name of the fueling station, generate a directory path based on the extracted one or more strings and one or more lookup tables, move and store the fueling data file from the temporary location to a destination location based on the generated directory path when the fueling data file does not already exist in the destination location, analyze the vehicle fueling data in the second file format to identify the vehicle fueling data as fueling files from non-fueling files, and allow another server to automatically sort the fueling data files without having to open and read, and process the fueling data files by using the table.

2. The system of claim 1, wherein the server is further configured to update the table with the name of the fuel provider and the name of the fueling station included in the fueling station data.

3. The system of claim 2, wherein the table is stored on the database or the memory of the server in a comma-separated values (CSV) file format.

4. The system of claim 1, wherein the database is further configured to receive the fueling station data from a user device or the fueling station.

5. The system of claim 1, wherein to move and store the fueling data file from the temporary location to the destination location, the server is configured to:

determine whether the fueling data file already exists in the destination location based on the generated directory path.

6. The system of claim 1, wherein the server extracts the one or more strings from the row of the one or more rows that includes the obtained file number based on one or more predetermined column names or numbers.

7. The system of claim 1, wherein to generate the directory path, the server is configured to:

scan a plurality of fuel provider names included in the one or more lookup tables for the extracted one or more strings corresponding to the name of the fuel provider, the one or more lookup tables relating each of the plurality of fuel provider names to a fuel provider directory of one or more fuel provider directories stored on the database or the memory;

select a respective fuel provider directory of the one or more fuel provider directories that is related to a respective fuel provider name of the plurality of fuel provider names that matches the extracted one or more strings corresponding to the name of the fuel provider;

determine a first directory name based on the selected respective fuel provider directory; and generate the directory path based on the determined first directory name.

8. The system of claim 7, wherein to generate the directory path, the server is further configured to:

scan a plurality of fueling station names included in the one or more lookup tables for the extracted one or more strings corresponding to the name of the fueling station, the one or more lookup tables relating each of the plurality of fueling station names to a fueling station directory of one or more fueling station directories stored on the database or the memory;

select a respective fueling station directory of the one or more fueling station directories that is related to a respective fueling station name of the plurality of fueling station names that matches the extracted one or more strings corresponding to the name of the fueling station;

determine a second directory name based on the selected respective fueling station directory; and generate the directory path further based on the determined second directory name.

9. The system of claim 8, wherein:

the server is further configured to parse the filename of the fueling data file to obtain a timestamp indicating when the instance of refueling the vehicle by the fueling station occurred, the timestamp including a year, a month, and a day; and generating the directory path is further based on the obtained timestamp.

10. The system of claim 9, wherein to generate the directory path, the server is further configured to:

scan a plurality of years included in the one or more lookup tables for the year included in the obtained timestamp, the one or more lookup tables relating each of the plurality of years to a year directory of one or more year directories stored on the database or the memory;

select a respective year directory of the one or more year directories that is related to a respective year of the plurality of years that matches the year included in the obtained timestamp;

determine a third directory name based on the selected respective year directory; and generate the directory path further based on the determined third directory name.

11. The system of claim 10, wherein to generate the directory path, the server is further configured to:

scan a plurality of months included in the one or more lookup tables for the month included in the obtained timestamp, the one or more lookup tables relating each of the plurality of months to a month directory of one or more month directories stored on the database or the memory;

select a respective month directory of the one or more month directories that is related to a respective month of the plurality of months that matches the month included in the obtained timestamp;

determine a fourth directory name based on the selected respective month directory; and generate the directory path further based on the determined fourth directory name.

12. The system of claim 11, wherein to generate the directory path, the server is further configured to:

scan a plurality of days included in the one or more lookup tables for the day included in the obtained timestamp, the one or more lookup tables relating each of the plurality of days to a day directory of one or more day directories stored on the database or the memory;

select a respective day directory of the one or more day directories that is related to a respective day of the plurality of days that matches the day included in the obtained timestamp;

determine a fifth directory name based on the selected respective day directory; and generate the directory path further based on the determined fifth directory name.

13. The system of claim 1, wherein the first file format is a raw data file format.

14. A method for sorting and storing fueling station data, the method comprising:

storing, by a server, a fueling data file in a temporary location on a memory of the server, the fueling data file having a filename and including data corresponding to an instance of refueling a vehicle by a fueling station, wherein the data includes an ambient temperature, a temperature of the fuel tank, a pressure within the fuel tank, an amount of fuel within the fuel tank, and an amount of fuel received from the fueling station;

parsing, by the server, the filename of the fueling data file to obtain a file number and a timestamp that is associated with the fueling data file;

scanning, by the server, one or more rows of a table for the obtained file number, wherein the table includes a summary of data corresponding to the instance of refueling the vehicle;

extracting, by the server, one or more strings from a row of the one or more rows that includes the obtained file number, the one or more strings corresponding to a name of a fuel provider and/or a name of the fueling station;

determining, by the server, one or more directory names based on the extracted one or more strings and one or more lookup tables;

generating, by the server, a directory path based on the determined one or more directory names;

moving and storing, by the server, the fueling data file from the temporary location to a destination location on the memory based on the generated directory path when the fueling data file does not already exist in the destination location;

analyzing, by the server, the data to identify the data as fueling files from non-fueling files; and allowing, by the server, another server to automatically sort the fueling data files without having to open and read, and process the fueling data files by using the table.

15. The method of claim 14, wherein the table is stored on a database or the memory of the server in a comma-separated values (CSV) file format.

16. The method of claim 14, wherein the extracting, by the server, the one or more strings from the row of the one or more rows that includes the obtained file number includes:

extracting, based on a first predetermined column name or number, a first string of the one or more strings corresponding to the name of the fuel provider from the row; and extracting, based on a second predetermined column name or number, a second string corresponding to the name of the fueling station from the row.

17. The method of claim 16, wherein the determining, by the server, the one or more directory names based on the extracted one or more strings and the one or more lookup tables includes:

scanning a plurality of fuel provider names included in the one or more lookup tables for the extracted first string, the one or more lookup tables relating each of the plurality of fuel provider names to a fuel provider directory of one or more fuel provider directories stored on the memory;

selecting a respective fuel provider directory of the one or more fuel provider directories that is related to a respective fuel provider name of the plurality of fuel provider names that matches the extracted first string; and determining a first directory name of the one or more directory names based on the selected respective fuel provider directory.

18. The method of claim 17, wherein the determining, by the server, the one or more directory names based on the extracted one or more strings and the one or more lookup tables further includes:

scanning a plurality of fueling station names included in the one or more lookup tables for the extracted second string, the one or more lookup tables relating each of the plurality of fueling station names to a fueling station directory of one or more fueling station directories stored on the memory;

selecting a respective fueling station directory of the one or more fueling station directories that is related to a respective fueling station name of the plurality of fueling station names that matches the extracted first string; and determining a second directory name based on the selected respective fueling station directory.

19. The method of claim 14, further comprising:

determining, by the server, whether the fueling data file already exists in the destination location based on the generated directory path; and wherein the moving and storing, by the server, the fueling data file from the temporary location to the destination location on the memory is further based on a determination that the fueling data file does not already exist in the destination location.

* * * * *